United States Patent [19]

Booth et al.

[11] Patent Number: 4,951,797

[45] Date of Patent: Aug. 28, 1990

[54] ELECTROMAGNETIC COUPLING DISC

[75] Inventors: Dwight E. Booth, Janesville, Wis.; Daniel L. DeYoung, Roscoe, Ill.

[73] Assignee: Dana Corporation, Toledo, Ohio

[21] Appl. No.: 262,358

[22] Filed: Oct. 25, 1988

[51] Int. Cl.⁵ .......................... F16D 27/14; H01F 3/00
[52] U.S. Cl. ............................. 192/107 R; 192/84 C; 335/281
[58] Field of Search ................ 192/84 R, 84 A, 84 B, 192/84 C, 107 R; 188/161; 335/279, 281

[56] References Cited

U.S. PATENT DOCUMENTS

| 4,187,939 | 2/1980 | Silvestrini et al. | 192/84 C |
| 4,227,600 | 10/1980 | Shirai | 192/84 C |
| 4,685,202 | 8/1987 | Booth et al. | 29/607 |
| 4,818,840 | 4/1989 | Booth et al. | 219/121.72 |

FOREIGN PATENT DOCUMENTS

| 58-128537 | 8/1983 | Japan | 192/84 C |
| 637236 | 5/1950 | United Kingdom . | |
| 675249 | 7/1952 | United Kingdom . | |
| 1081284 | 8/1967 | United Kingdom . | |
| 2116651 | 9/1983 | United Kingdom . | |

Primary Examiner—Richard Lorence
Attorney, Agent, or Firm—Leydig, Voit & Mayer, Ltd.

[57] ABSTRACT

The non-working face of a coupling disc (i.e., the armature or rotor) of an electromagnetic coupling such as a clutch or brake is formed with radially spaced rows of angularly spaced grooves separated by radially extending bridges. The grooves terminate short of the working face of the disc and delineate magnetic poles in the disc. In some embodiments, radially spaced rows of grooves also are formed in the working face of the disc. In still other embodiments, excess metal resulting from rolling of the grooves in the non-working face of the disc is used to form integral locating flanges or the like adjacent the disc.

19 Claims, 2 Drawing Sheets

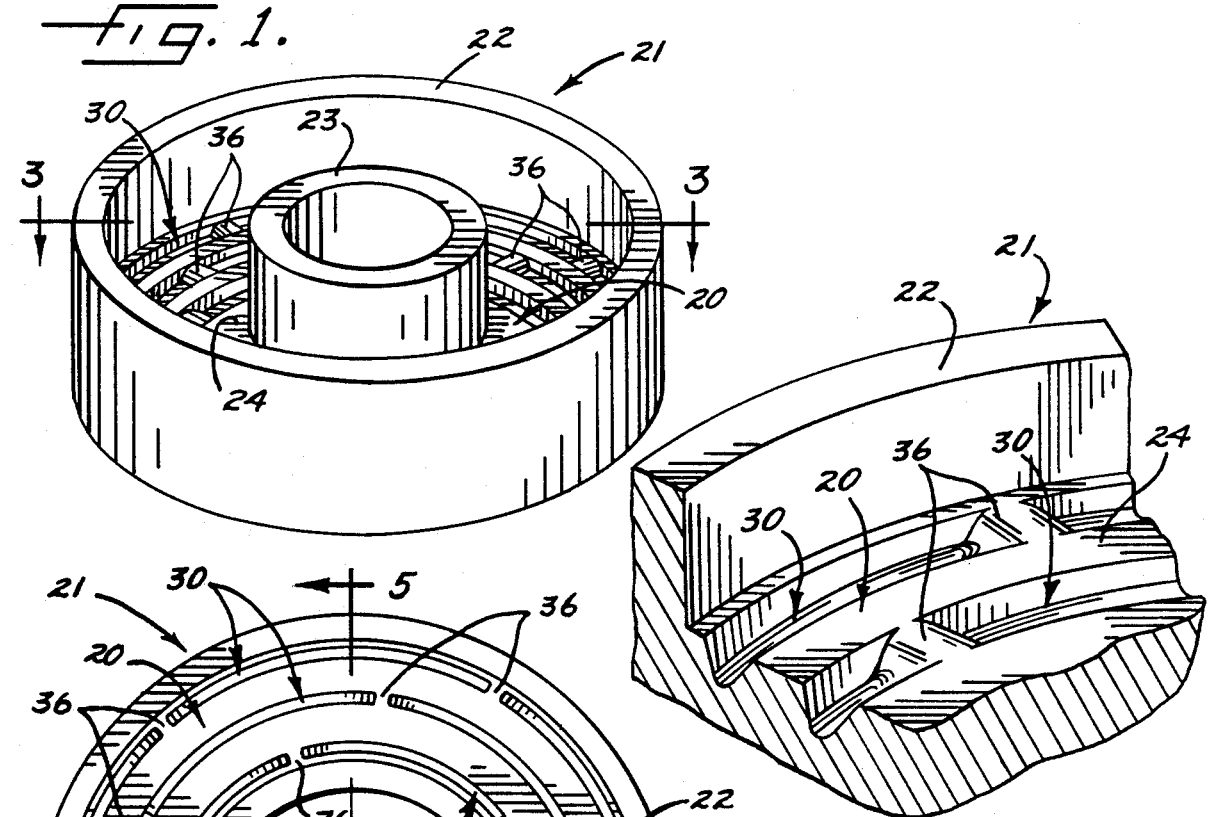
Fig. 1.
Fig. 2.
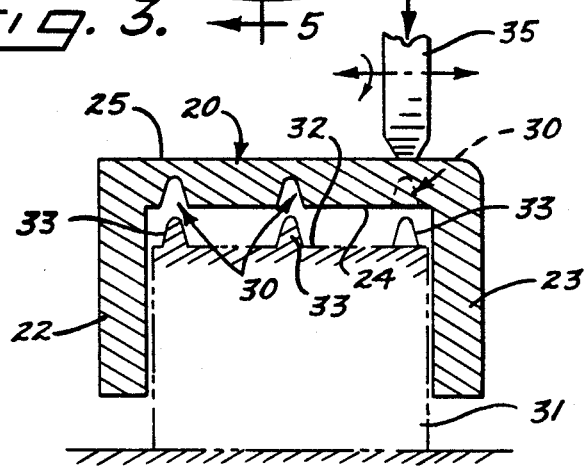
Fig. 3.
Fig. 4.
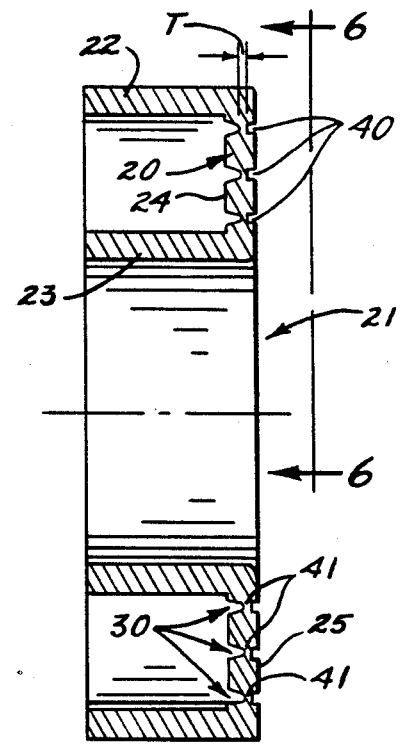
Fig. 5.

ELECTROMAGNETIC COUPLING DISC

BACKGROUND OF THE INVENTION

This invention relates to multiple pole coupling discs of the type used in an electromagnetic coupling such as an electromagnetic clutch or brake. The coupling disc may be part of a rotary or non-rotary field or may be a rotary or non-rotary armature.

A typical electromagnetic coupling is disclosed in Silvestrini et al U.S. Pat. No. 4,187,939 and, in that particular case, the coupling is an electromagnetic clutch having a rotary armature disc made of magnetic material such as steel and having a field with a rotary coupling disc or rotor which also is made of magnetic material. When the coil of the field is excited, magnetic flux threads a path between the rotor and the axially opposing armature and attracts the armature into engagement with the working face of the rotor to couple the two for rotation in unison.

In the coupling disclosed in the Silvestrini et al patent, the armature is formed with a ring of angularly spaced "banana" slots while the rotor is formed with two concentric rings of angularly spaced banana slots located on opposite sides of the ring of slots in the armature. The banana slots form high reluctance air gaps causing the rotor and armature to define four magnetic poles which increase the torque of a coupling having a coil of a given diameter. By forming an additional ring of slots in each of the rotor and armature, the coupling may be constructed as a six-pole coupling with even higher torque capacity.

Until just recently, the banana slots conventionally have been stamped in the rotor and armature. Presently available stamping techniques dictate that, as a general rule, the radial width of the slots cannot be substantially less than approximately ¾ the thickness of the disc. As a result, difficulty is encountered in stamping multiple rings of slots in a comparatively thick disc which is relatively small in diameter. In addition, stamping of the slots leaves burrs at the edges of the slots and tends to impose restrictions on the location of the slots in the disc and on the shape of the slots. It is difficult to maintain concentricity between adjacent rows of slots and it is difficult to keep all portions of the disc of a uniform thickness. The design of the disc thus tends to be dictated by tooling considerations rather than magnetic characteristics.

As an alternative to slotting the rotor and armature to form high reluctance air gaps, channels may be machined in the disc and then filled with non-magnetic material to define high reluctance barriers between the poles. Subsequently, the disc is machined to remove the bottoms of the magnetic channels and eliminate the flux leakage paths which otherwise would be created across the bottoms of the channels. This manufacturing process is relatively expensive and becomes even more so when each disc is formed with two or more high reluctance rings.

Formation of the slots in a coupling disc through the use of a laser beam is disclosed in commonly assigned Booth et al U.S. Pat. No. 4,685,202. In the method disclosed in that patent, the laser beam forms continuous slots which are immediately backfilled with non-magnetic material. Alternatively, the method contemplates the formation of angularly spaced banana slots separated by non-magnetic bridges which are formed by backfilling the spaces between the slots with non-magnetic material.

The methods disclosed in the aforementioned Booth et al patent represent remarkable improvements in the art of magnetic coupling discs. Even those methods, however, have some limitations. For example, the formation of slots of any substantial radial width requires the use of a very powerful laser having a beam of substantial diameter. In addition, backfilling of the slots or portions thereof imposes some restriction on the cross-sectional shape and/or the orientation of the slots.

Commonly assigned Booth et al U.S. application Ser. No. 133,145, filed Dec. 14, 1987 now U.S. Pat. No. 4,818,840, discloses another method of forming slots in an electromagnetic coupling disc through use of a laser. Specifically, the laser beam traces around the perimeter of each slot to be formed and forms the slot by cutting a slug of material from the disc. This method enables relatively precise control of the shape, location and edge finish of the slots but is somewhat slow from a manufacturing standpoint since the entire perimeter of each slot must be traced by the laser beam. In addition, it is necessary to reprogram the path of travel of the laser beam each time the slot configuration, location or size is changed.

SUMMARY OF THE INVENTION

The general aim of the present invention is to provide a new and improved electromagnetic coupling disc, and a method of making the same, which enables a coupling having a coil of a given diameter to produce higher torque and which, at the same time, is less vulnerable to variations in the manufacturing process.

A more detailed object is to achieve the foregoing through the provision of a coupling disc in which the magnetic poles are delineated by closed-end grooves in the non-working face of the disc rather than through slots so as to avoid many of the manufacturing difficulties which arise in the formation of slots by stamping or by laser cutting.

An important object of the invention is to form the grooves in the disc by means of a relatively simple but precise metal rolling method.

Still another object is to use the material displaced by the rolling method to form various functional components on the disc.

The invention also resides in the provision of strengthening bridges between adjacent grooves and in the novel formation of a second set of grooves in the working face of the disc in order to better define and delineate the magnetic poles of the disc.

These and other objects and advantages of the invention will become more apparent from the following detailed description when taken in conjunction with the accompanying drawings.

BRIEF DESCRIPTION OF THE DRAWINGS

FIG. 1 is a perspective view showing one type of a new and improved electromagnetic coupling disc incorporating the unique features of the present invention.

FIG. 2 is an enlarged perspective view of a portion of the disc shown in FIG. 1.

FIG. 3 is an enlarged top plan view of the disc as taken along the line 3—3 of FIG. 1.

FIG. 4 is an enlarged cross-section taken along the line 4—4 of FIG. 3 and schematically shows the grooves being formed in the non-working face of the disc.

FIG. 5 is a cross-section taken along the line 5—5 of FIG. 3.

DETAILED DESCRIPTION OF THE PREFERRED EMBODIMENTS

Figure 6:
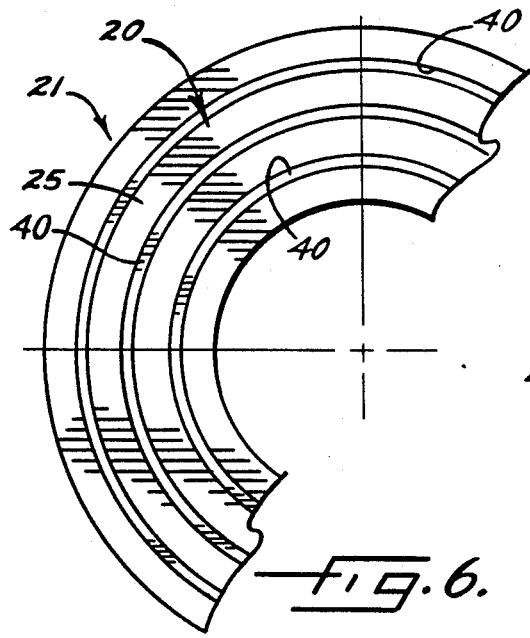
FIG. 6 is a fragmentary view of the working face of the disc as taken along the line 6—6 of FIG. 5.

The drawings illustrate the present invention as being incorporated in a coupling disc 20 for use in an electromagnetic coupling such as an electromagnetic brake or clutch. While the disc could be an armature, it herein is shown as forming part of a clutch rotor 21 which may, for example, be of the type disclosed in the aforementioned Silvestrini et al patent. In this particular instance, the rotor is circular in shape and includes an axially extending outer flange 22 and an axially extending inner hub 23 which preferably are integral with one face 24 of the disc 20. The opposite face 25 (FIG. 4) of the disc forms the working face of the rotor 21 and is adapted to frictionally engage the armature of the clutch. The flange 22 and the hub 23 define the outer and inner pole rings, respectively, of the rotor 21.

As is conventional, the rotor 21 is made of low reluctance magnetic material such as steel. While the rotor could be cast and then machined, it preferably is formed by a stamping or drawing operation.

The specific rotor 21 which has been illustrated in FIGS. 1 to 6 forms part of a six-pole clutch and thus the disc 20 includes three concentric rings 30 (FIG. 3) which carry less magnetic flux than the remaining areas of the disc. One magnetic pole is defined by that annular area of the disc located radially inwardly of the inner ring, two poles are defined by the annular area between the inner ring and the middle ring, two additional poles are defined by the annular area between the middle ring and the outer ring, and the sixth pole is defined by the annular area located outwardly of the outer ring.

In accordance with the primary aspect of the present invention, the rings 30 are defined by closed-end grooves which are formed in the non-working face 24 of the disc 20 in a unique manner. As compared to coupling discs having magnetic barriers formed by either open slots or by slots filled with non-magnetic material, the grooved disc 20 is easier to manufacture on a high speed production basis, is less vulnerable to minor manufacturing variations and is less subject to fatigue failure.

The preferred method of forming the grooves 30 in the non-working face 24 of the disc 20 is illustrated in FIG. 4. In carrying out this method, provision is made of a circular ring-like die 31 having a forming face 32 adapted to be disposed in opposing relation with the non-working face 24 of the disc 20. Formed on and projecting axially from the forming face of the die are three radially spaced and circumferentially extending ribs 33 which are used to form the grooves 30.

After the rotor 21 has been stamped, it is placed on the die 31 with the outer and inner pole rings 22 and 23 straddling the die and with the non-working face 24 of the disc 20 lying against the crests of the ribs 33. With the rotor 21 in this position, the rotor and the die 31 are slowly rotated in unison about the axis of the rotor. During such rotation, a roller 35 (FIG. 4) is traversed radially back and forth across the working face 25 of the disc 20 and is forced in a direction pressing the non-working face 24 of the disc against the ribs 33 of the die 31. The roller rotates about an axis which is perpendicular to the disc and, as it traverses across and pushes on the working face 25, it causes the ribs to displace the metal of the non-working face 24 of the disc and thereby form the grooves 30 by cold flow of the metal. The height of the ribs is less than the thickness of the disc and thus the grooves are formed with closed ends or bottoms and do not interrupt the working face 25 of the disc.

A typical disc 20 has a thickness of approximately 0.165" and is formed with grooves 30 having a nominal depth of 0.120". Each groove preferably is formed with a concavely curved closed end and is formed with side walls which flare away from one another as they progress from the closed end of the groove toward the non-working face 24 of the disc 20. By way of example, each side wall may flare at an angle of approximately fifteen degrees.

The construction of the disc 20 as described thus far enables the rotor 21 to effectively function in a multiple pole electromagnetic coupling. The voids created by the grooves 30 establish air gaps which are resistant to the flow of magnetic flux and thus cause magnetic poles to be set up on opposite sides of each groove. While there is some flux leakage through those webbed areas located between the closed ends of the grooves 30 and the working face 25 of the disc 20, such flux leakage is not sufficiently great to be detrimental in certain types of couplings. When formed as described, the grooves 30 are of a very precise shape, are very accurately located and are precisely concentric. The webbed areas at the closed ends of the grooves 30 have virtually the same thickness at all three rows of grooves and, in addition, there are virtually no variations from rotor-to-rotor. The existence of the continuous webs at the closed ends of the grooves strengthens the disc 20 and makes the disc less likely to fail in fatigue when compared to a disc with through-slots. Moreover, the grooves 30 enable the use of a disc 20 of smaller radial width than is the case when a disc is slotted by conventional stamping techniques. This permits a coupling capable of producing torque of a given magnitude to be constructed as a smaller-diameter package.

In the preferred embodiment of the disc 20, the grooves 30 of each row or ring are spaced angularly from one another and are separated by radially extending bridges 36 (FIG. 2) which increase the structural integrity of the disc. Herein, the bridges 36 are formed simply by interrupting the ribs 33 of the die 31 at angularly spaced locations. As a result, the disc 20 is not grooved at those locations but instead is left with bridges 36 which have a thickness approximtely equal to the original thickness of the disc. To reduce stress areas, the ends of the ribs 33 are concavely radiused so that the bridges 36 are convexly radiused when viewed from the non-working face 24 of the disc 20 as is apparent from FIG. 2. The bridges 36 of adjacent rings of grooves 30 are offset angularly from one another in order to reduce flux leakage between adjacent rings (see FIG. 3).

With certain couplings, the rotor 21 may be used as constructed in the manner described above and without any machining operations whatsoever. In some instances, it may be desirable to just lightly machine the working face 25 of the disc 20 in order to bring the working face into more precise squareness and flatness and to remove any small dimples which might have been created during formation of the grooves 30. Such machining improves the magnetic characteristics of the disc but, since only light machining is required, it may be accomplished faster and easier than is the case where slots are stamped in the disc.

To further improve the magnetic characteristics of the disc 20, shallow and circular grooves 40 may be formed in the working face 25 of the disc as illustrated in FIGS. 5 and 6. The grooves preferably are circumferentially continuous and, in the embodiment shown in FIGS. 5 and 6, are alined radially with the grooves 30. The grooves 40 are not so deep as to extend completely to the grooves 30 or to the non-working face 24 of the disc 20. Instead, each groove 40 has a nominal depth of only about 0.035" and thus an axially thin web 41 (FIG. 5) having a nominal thickness T of about 0.010" is left between radially alined grooves 30 and 40. The grooves 40 reduce flux leakage, establish better magnetic pole definition in the disc 20 and may be formed either by conventional machining or by laser cutting. In each case, less time is required than is necessary for through-slots since the grooves 40 extend only through a fraction of the thickness of the disc.

Figure 7:
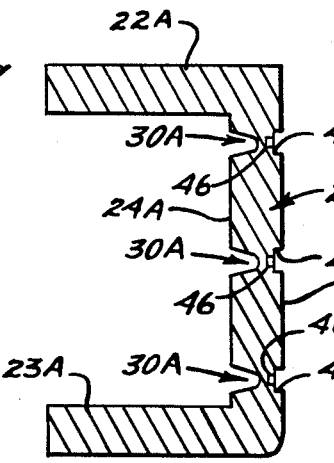
FIG. 7 is a cross-section generally similar to FIG. 4 but shows a variation of the groove formation in the working face of the disc.

A disc 20A with a modified working face 25A is shown in FIG. 7. In this instance, each groove on the working face includes a portion 45 of relatively large radial width immediately adjacent the working face and a portion 46 of smaller radial width adjacent the closed end of the groove 30A. While a stepped groove configuration of this type is more difficult to manufacture, it establishes even better definition of the magnetic poles while maintaining relatively good structural integrity.

Figure 8:
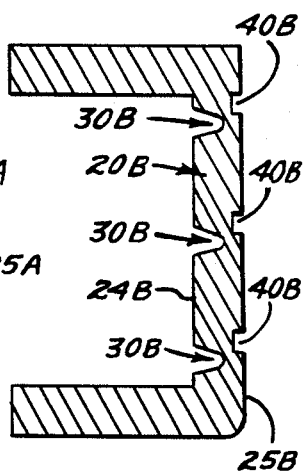
FIG. 8 is a cross-section similar to FIG. 7 but shows still another variation of the groove formation in the working face of the disc.

A disc 20B with yet a different type of working face 25B is shown in FIG. 8. In this instance, the grooves 40B in the working face are offset radially outwardly from the grooves 30B in the non-working face 24B. Such offset increases the effective length of the torque arm of each pole and enables the coupling to transmit torque of a higher magnitude.

Figure 9:
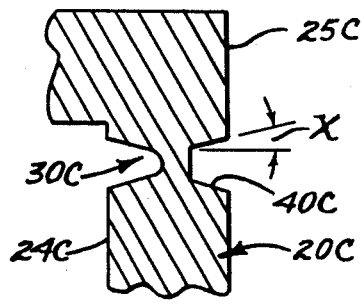
FIG. 9 is an enlarged fragmentary view of a portion of a disc and shows yet another variation of the groove formation in the working face of the disc.

In the disc 20C shown in FIG. 9, the grooves 40C in the working face 25C are not formed with parallel side walls but instead each groove is formed with inclined side walls which flare away from one another at an angle X of about twenty degrees as the side walls progress toward the working face. As a result, each groove 40C has a relatively large radial width at the working face 25C and tapers to a progressively smaller radial width. By virtue of this arrangement, each groove 40C becomes narrower as the coupling wears in and as the air gap between the disc 20C and the coacting armature increases. This enables the static and dynamic torque of the coupling to be relatively high during the early life of the coupling and to modulate as the coupling wears in.

Figure 10:
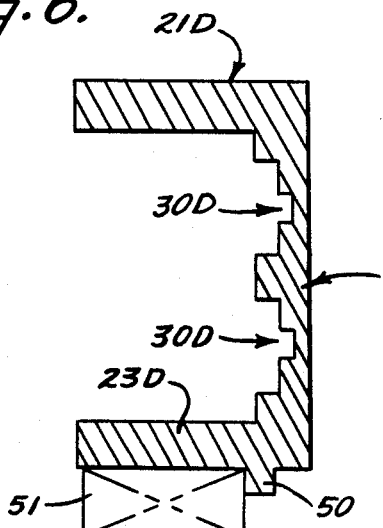
FIG. 10 is a cross-sectional view of a coupling disc which is formed with an integral locating flange for a bearing.

FIG. 10 shows a disc 20D in which the grooves 30D are of a multi-stepped configuration. In addition, a circular flange 50 projects radially inwardly from the inner side of the inner pole ring 23D adjacent the junction of that ring with the disc 20D. The flange 50 serves as a locator and stop shoulder for a mounting bearing 51 for the rotor 21D. The flange 50 is integral with the inner ring 23D and is created by the excess metal resulting from rolling the grooves 30D in the disc 20D. That metal is directed toward the inner ring 23D by appropriate dies and/or rollers and is extruded to form the flange 50. This takes advantage of the excess material and eliminates the need for an initially thick inner ring where much of the material must be machined away to leave a flange. In the present instance, no machining is required to produce and locate flange 50.

Figure 11:
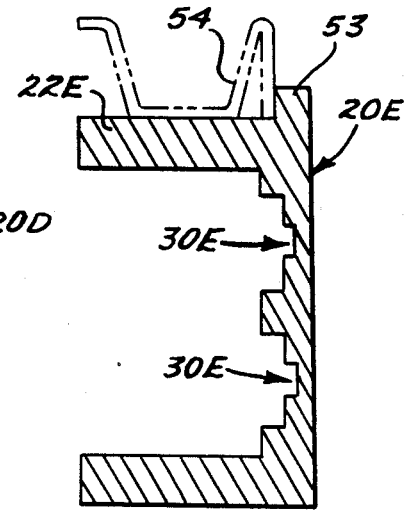
FIG. 11 is a view similar to FIG. 10 but shows a coupling disc which is formed with an integral locating flange for a pulley.

A similar concept is embodied in the disc 20E shown in FIG. 11. In this instance, however, the excess material resulting from rolling the grooves 30E is directed outwardly to form a circular flange 53 which projects radially outwardly from the outer side of the outer pole ring 22E adjacent the junction of that ring and the disc 20E. The flange 53 may serve as a locator and stop shoulder for a drive pulley 54.

Figure 12:
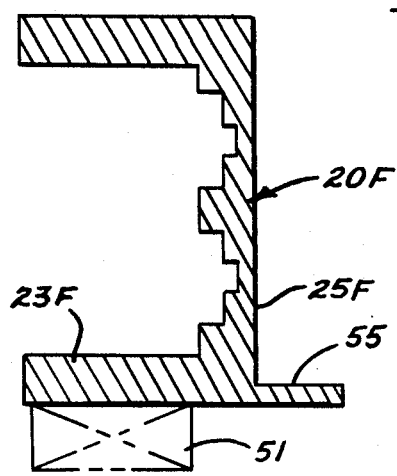
FIG. 12 is another view similar to FIG. 10 but shows a coupling disc which is formed with an integral grease guard.

In the disc 20F shown in FIG. 12, the excess material is extruded axially to form a circular flange 55 which projects axially outwardly from the working face 25F of the disc 20F adjacent the inner side of the inner pole ring 23F. The flange serves as a guard to help protect the working face 25F from lubricants in the area of the bearing 51.

Figure 13:
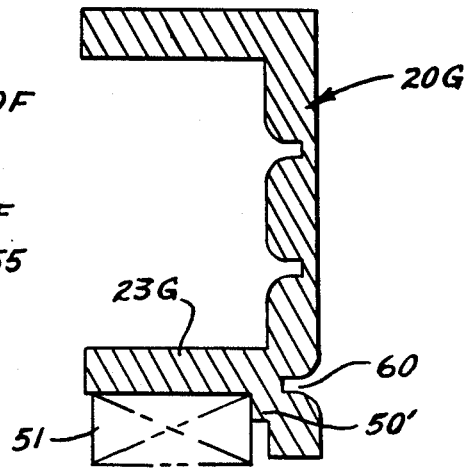
FIG. 13 is still another view similar to FIG. 10 but shows a coupling disc with a modified magnetic pole construction.

FIG. 13 shows a disc 20G with a radially inwardly projecting flange 50' formed in the same general manner as the flange 50 of the disc 20D of FIG. 10. In this embodiment, however, a groove 60 is rolled into the working face side of the flange 50' to create an additional magnetic pole face.

We claim:

1. A multiple pole coupling disc for an electromagnetic coupling, said disc being made of magnetic material and having a working face and an oppositely facing non-working face, said working face being adapted to engage another coupling disc of the electromagnetic coupling, radially spaced rows of grooves formed in and extending generally circumferentially around the non-working face of said disc to delineate adjacent magnetic poles, each of said grooves having a closed end, having opposing side walls and terminating short of the working face of said disc whereby said grooves leave said working face free of interruptions.

2. A coupling disc as defined in claim 1 further including radially spaced rows of second grooves formed in and extending around the working face of said disc, said second grooves having closed ends and terminating short of the non-working face of said disc.

3. A coupling disc as defined in claim 2 in which at least portions of said second grooves are alined radially and angularly with portions of said first grooves, there being narrow webs of said magnetic material located between the closed ends of the alined portions of said first and second grooves.

4. A coupling disc as defined in claim 2 in which second grooves are offset radially from said first grooves.

5. A multiple pole coupling disc for an electromagnetic coupling, said disc being made of magnetic material and having a working face and an oppositely facing non-working face, said working face being adapted to engage another coupling disc of the electromagnetic coupling, a first series of radially spaced rows of angularly spaced grooves formed in the non-working face of said disc to delineate magnetic poles between adjacent rows of grooves each of said grooves having a closed end terminating short of the working face of said disc whereby said grooves leave said working face free of interruptions, the closed end of each groove being concavely curved, each groove having opposing side walls which flare away from one another upon progressing from the closed end of the groove toward the non-working face of the disc, the spaces between the angularly spaced grooves of each row being filled with bridges made of said magnetic material and each having an axial thickness approximately equal to the axial thickness of said disc, a second series of radially spaced rows of grooves formed in the working face of said disc, each of the grooves of the second series having a closed end and terminating short of the non-working face of the disc, at least portions of the grooves of said second series being alined radially and angularly with portions of the grooves of said first series, there being narrow webs of said magnetic material located between the closed ends of the alined portions of the grooves of said first and second series.

6. A coupling disc as defined in claim 5 in which each of said bridges has a convexly curved shape when viewed from the non-working face of said disc.

7. A coupling disc as defined in claim 6 in which the bridges of each row of grooves are offset angularly from the bridges of each adjacent row of grooves.

8. A multiple pole coupling disc for an electromagnetic coupling, said disc being made of magnetic material and having a working face and an oppositely facing non-working face, said working face being adapted to engage another coupling disc of the electromagnetic coupling, groove means formed in and extending generally circumferentially around the non-working face of said disc to delineate adjacent magnetic poles, said groove means having closed ends and terminating short of the working face of said disc whereby said groove means leave said working face free of interruptions, said groove means being defined by a series of angularly spaced grooves, the spaces between said grooves being filled by bridges made of said magnetic material and each having an axial thickness approximately equal to the axial thickness of said disc.

9. A coupling disc as defined in claim 8 in which each of said bridges has a convexly curved shape when viewed from the non-working face of said disc.

10. A multiple pole coupling disc for an electromagnetic coupling, said disc being made of magnetic material and having a working face and an oppositely facing non-working face, said working face being adapted to engage another coupling disc of the electromagnetic coupling, groove means formed in and extending generally circumferentially around the non-working face of said disc to delineate adjacent magnetic poles, said groove means having closed ends and terminating short of the working face of said disc whereby said groove means leave said working face free of interruptions, said groove means including radially spaced rows of angularly spaced grooves, the spaces between adjacent angularly spaced grooves of each row being filled by bridges made of said magnetic material and each having an axial thickness approximately equal to the axial thickness of said disc.

11. A coupling disc as defined in claim 10 in which the bridges of each row of grooves are offset angularly from the bridges of each adjacent row of grooves.

12. A multiple pole coupling disc for an electromagnetic coupling, said disc being made of magnetic material and having a working face and an oppositely facing non-working face, said working face being adapted to engage another coupling disc of the electromagnetic coupling, groove means formed in and extending generally circumferentially around the non-working face of said disc to delineate adjacent magnetic poles, said groove means having closed ends and terminating short of the working face of said disc whereby said groove means leave said working face free of interruptions, second groove means formed in and extending around the working face of said disc, said second groove means having closed ends and terminating short of the non-working face of said disc, at least portions of said second groove means being alined radially and angularly with portions of said first groove means, there being narrow webs of said magnetic material located between the closed ends of the alined portions of said first and second groove means.

13. A coupling disc as defined in claim 12 in which said second groove means comprise a series of grooves, each of said second grooves having a first portion of relatively wide radial width at the working face of the disc and having a second portion of narrower radial width located nearer to the non-working face of the disc.

14. A coupling disc as defined in claim 12 in which said second groove means comprise a series of grooves, each of said second grooves having opposing side walls which flare away from one another upon progressing toward the working face of said disc.

15. A multiple pole coupling disc for an electromagnetic coupling, said disc being made of magnetic material and having a working face and an oppositely facing non-working face, said working face being adapted to engage another coupling disc of the electromagnetic coupling, groove means formed in and extending generally circumferentially around the non-working face of said disc to delineate adjacent magnetic poles, said groove means having closed ends and terminating short of the working face of said disc whereby said groove means leave said working face free of interruptions, said disc forming part of an electromagnetic couping rotor having inner and outer rings formed integrally with and projecting axially from the non-working face of the disc, and a flange formed integrally with and extending circumferentially around the inner side of said inner ring, said flange projecting radially inwardly from the inner side of said inner ring near the non-working face of said disc and defining a stop shoulder for a bearing.

16. A multiple pole coupling disc for an electromagnetic coupling, said disc being made of magnetic material and having a working face and an oppositely facing non-working face, said working face being adapted to engage another coupling disc of the electromagnetic coupling, groove means formed in and extending generally circumferentially around the non-working face of said disc to delineate adjacent magnetic poles, said groove means having closed ends and terminating short of the working face of said disc whereby said groove means leave said working face free of interruptions, said disc forming part of an electromagnetic coupling rotor having inner and outer rings formed integrally with and projecting axially from the non-working face of the disc, and a flange formed integrally with and extending circumferentially around the outer side of said outer ring, said flange projecting radially outwardly from the outer side of said outer ring near the non-working face of said disc and defining a stop shoulder for a pulley.

17. A multiple pole coupling disc for an electromagnetic coupling, said disc being made of magnetic material and having a working face and an oppositely facing non-working face, said working face being adapted to engage another coupling disc of the electromagnetic coupling, groove means formed in and extending generally circumferentially around the non-working face of said disc to delineate adjacent magnetic poles, said groove means having closed ends and terminating short of the working face of said disc whereby said groove means leave said working face free of interruptions, said disc forming part of an electromagnetic coupling rotor having inner and outer rings formed integrally with and projecting axially from the non-working face of the disc, and an annular flange formed integrally with and projecting axially from the working face of said disc and having an inner side substantially concentric with the inner side of said inner ring, said flange defining a shield for protecting the working face of the disc from lubricants.

18. A multiple pole coupling disc for an electromagnetic coupling, said disc being made of magnetic material and having a working face and an oppositely facing non-working face, said working face being adapted to engage another coupling disc of the electromagnetic coupling, groove means formed in and extending generally circumferentially around the non-working face of said disc to delineate adjacent magnetic poles, said groove means having closed ends and terminating short of the working face of said disc whereby said groove means leave said working face free of interruptions, said disc forming part of an electromagnetic coupling rotor having inner and outer rings formed integrally with and projecting axially from the non-working face of the disc, a flange formed integrally with and extending around the inner side of said inner ring adjacent the junction of said inner ring and said disc, said flange having an axially facing surface which is coplanar with the working face of said disc, and circumferentially extending groove means formed in said axially facing surface of said flange adjacent the inner side of said inner ring and spaced radially inwardly from said groove means in the non-working face of said disc.

19. A multiple pole coupling disc for an electromagnetic coupling, said disc being made of magnetic material and having a working face and an oppositely facing non-working face, said working face being adapted to engage another coupling disc of the electromagnetic coupling, groove means formed in and extending generally circumferentially around the non-working face of said disc to delineate adjacent magnetic poles, said groove means having closed ends and terminating short of the working face of said disc whereby said groove means leave said working face free of interruptions, said groove means being defined by a series of grooves, the closed end of each groove being concavely curved, each groove having opposing side walls which flare away from one another upon progressing from the closed end of the groove toward the non-working face of the disc.

* * * * *